Apr. 17, 1923. 1,451,689
J. R. FLEMING
TIGHT AND LOOSE WHEEL
Filed Mar. 4, 1922
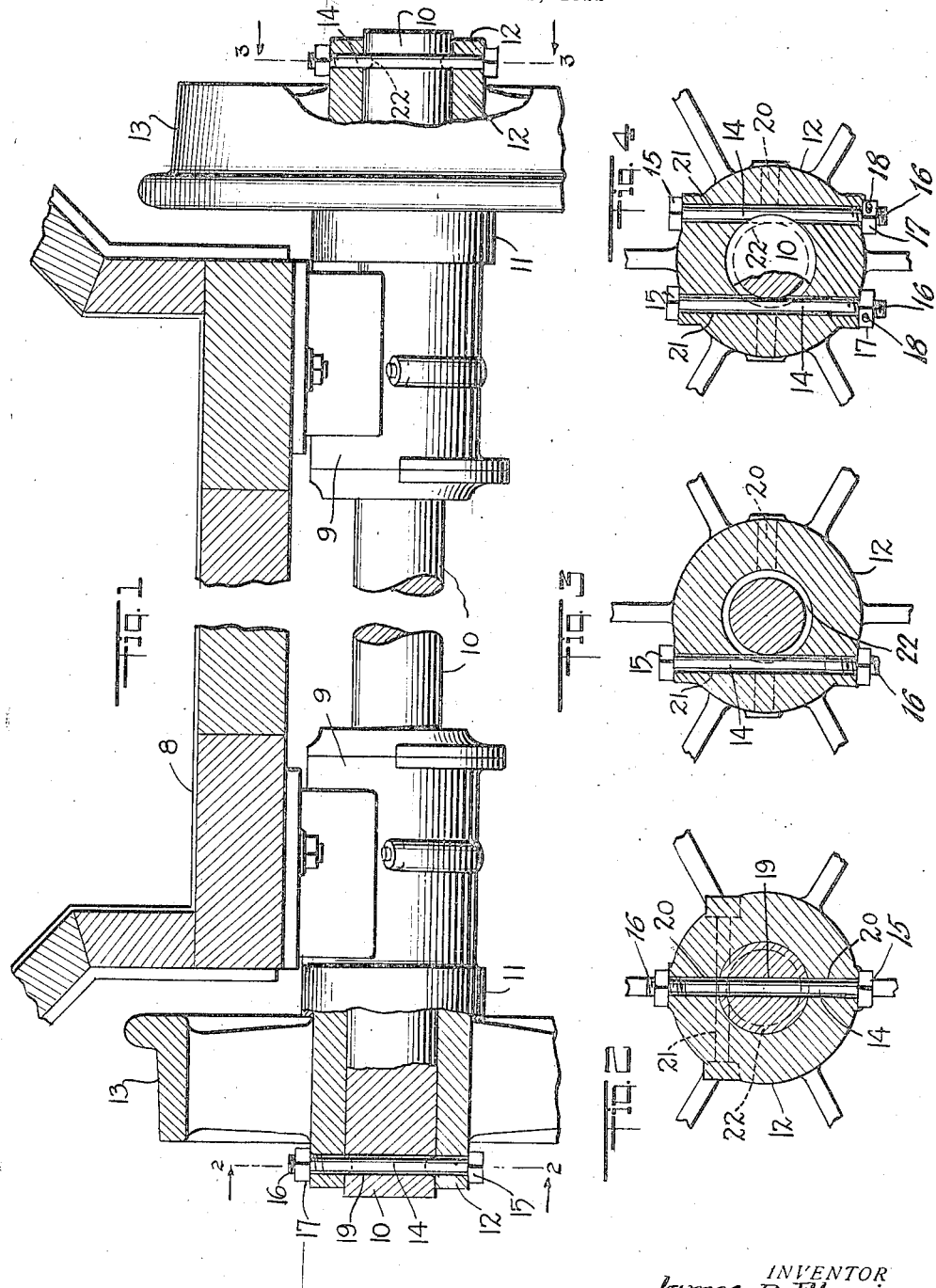
INVENTOR
James R. Fleming
BY
ATTORNEY Patented Apr. 17, 1923.

1,451,689

UNITED STATES PATENT OFFICE.

JAMES R. FLEMING, OF SCRANTON, PENNSYLVANIA.

TIGHT AND LOOSE WHEEL.

Application filed March 4, 1922. Serial No. 540,997.

*To all whom it may concern:*

Be it known that I, JAMES R. FLEMING, a citizen of the United States, and a resident of Scranton, in the county of Lackawanna and State of Pennsylvania, have invented certain new and useful Improvements in Tight and Loose Wheels, of which the following is a full, clear, and exact description.

This invention relates to wheel mountings, and in particular, to the type used on mine trucks and cars.

A particular object of the invention is to provide a wheel mounting whereby the wheels may rotate independently of the axles in one instance and may rotate therewith in another.

Another object is to provide locking means in conjunction with the wheels and axles which may be all used independently to lock any or all of the wheels to the axles.

Another object is to provide a locking means which, while serving to prevent the wheel from slipping off the axle, will permit free rotation of said wheel relatively thereto, said locking means being capable of use for fixedly holding the wheel in revoluble relation with the axle.

Drawings.

Figure 1 is an elevation partly in section taken transversely of a mine car or truck showing a portion of the wheels and axle, the bearing journal boxes being shown in their relation to the car and my invention being shown as applied to the axle and wheels.

Figure 2 is a section taken on the line 2—2 in Figure 1 and illustrates my invention used as a means of locking the wheel and axle together so that both will rotate in unison.

Figure 3 is a section taken on the line 3—3 in Figure 1 and illustrates my invention used simply to prevent the wheel from leaving the axle, the wheel being free to rotate on the axle.

Figure 4 is a section similar to those shown in Figures 2 and 3 and illustrating the use of double wheel retaining means.

Description.

Referring to the drawings in detail, a mine car or truck 8 is mounted upon the suitable journal boxes 9 wherein are contained the usual bearing elements necessary in reducing friction to a minimum, and through which passes the axle 10.

The journal boxes 9 are formed to comprise flanges 11 which overlie the inner edges of the hubs 12 of the flanged wheels 13. The flanges 11 are thus formed to provide grease tight joints so that the grease used in lubricating the bearings will not exude from between the wheel hubs 12 and the journal boxes 9.

The wheels 13 are, of course, adapted particularly for the narrow gauge tracks of a mine and are of the spoke and rim type.

In the use of the mine cars, some people prefer to have the wheels locked to the axle, and others prefer them loosely mounted. In the latter case the car will more easily take the sharp curves in the track due to the lack of friction which would ordinarily occur at the outer wheels when they were locked to the axles.

In locking a wheel to the axle, use is made of a bolt 14 having a head 15 at one end and having its other end threaded as at 16 to receive a nut 17 which may be held in place on the bolt by a suitable cotter or driven pin 18. The axle is bored diametrically as at 19, said bore registering with hub bores 20. The bolt is then passed through the hub and axle and in this position not only retains the wheel upon the axle but causes the unit rotation of both. The bolt is preferably placed near the outer end of the hub 12 for convenience in changing and assembling.

When it is desired to have the wheel rotate independently of the axle, the bolt is removed from the axle bore 19 and is passed through a bore 21 in the hub, said bore being disposed transversely of the bore 20 and tangentially of the axle, it being also in registry with a circumferential groove 22 formed in the axle. Therefore, when the bolt is inserted, it lies in the groove 22 and prevents the wheel from being removed from the axle and at the same time allows the wheel to rotate relatively thereto.

The groove 22 may have the bore 19 passing therethrough but the latter is preferably offset so as not to cause a weak portion in the axle by reduction of material.

Suitable countersinks and flats may be provided in the hubs 12 for accommodating the bolt heads and nuts.

When it is desired to have better balance of the wheel upon the axle and a more secure holding means, two bolts may be used instead of one, in which case, the hub 12 will be provided with two bores similar to 21 and both bolts will lie in the groove 22 as is plainly shown as a modification in Figure 4.

It can thus be seen, that any or all of the wheels may be locked to rotate with the axle, in which instance the wear would of course come upon the bearings. When the wheels are free to rotate upon the axles, the wear is distributed upon the axle and the bearings.

Claims.

1. In combination, a rotative element, rotative members mounted on said rotative element, and means for securing said rotative members on said rotative element and against accidental removal therefrom, said means being adapted to cause unitary rotation of said element and members in one of its positions of operation, and to allow for relative rotation between said element and said devices in its other position of operation.

2. In combination, an axle having wheels mounted thereon, and means for securing the wheels on said axle and against accidental removal therefrom, said means being adapted to cause unitary rotation of the axle and wheels in one of its positions of operation, and to allow for relative rotation between the axle and the wheels in its other position of operation.

3. The combination with a car having axles and wheels mounted thereon, of members adapted to pass through portions of the wheels and engage the axles, said members being capable of causing unitary rotation of the wheels and axles when in one position and being capable, when rearranged, to allow relative rotation therebetween, said members when in any position being capable of preventing the wheels from becoming disengaged from the axles.

4. The combination with an axle having wheels mounted thereon, and means adapted to interchangeably connect the axle and wheels together and against accidental separation one from the other, said means acting to cause the unitary rotation of the axle and wheels in one of its positions of operation, and to allow for relative rotation of the axle and the wheels in its other position of operation.

5. The combination with an axle having bores extending diametrically therethrough and grooves formed circumferentially therearound, of wheels mounted on the axle, and bolts adapted to be interchangeably engaged in the bores and grooves of the axle for securing said wheels against accidental removal from the axle at all times, said bolts acting to cause unitary rotation of the axle and wheels when engaged with the bores only of the axle, and to allow relative rotation of the axles and the wheels when engaged with the grooves only of the axle.

JAMES R. FLEMING.